United States Patent [19]
Siefert

[11] Patent Number: 5,904,485
[45] Date of Patent: May 18, 1999

[54] AUTOMATED LESSON SELECTION AND EXAMINATION IN COMPUTER-ASSISTED EDUCATION

[75] Inventor: David M. Siefert, Englewood, Ohio

[73] Assignee: NCR Corporation, Dayton, Ohio

[21] Appl. No.: 08/334,778

[22] Filed: Nov. 4, 1994

Related U.S. Application Data

[63] Continuation-in-part of application No. 08/217,065, Mar. 24, 1994.

[51] Int. Cl.$^6$ ............................. G09B 3/00; G09B 19/00; G09B 7/00
[52] U.S. Cl. ........................ 434/322; 434/236; 434/237; 434/323; 434/327; 434/335; 434/336; 434/350; 434/362
[58] Field of Search .................... 434/236, 350, 434/307 R, 323, 362, 322, 327, 335, 336, 353, 237

[56] References Cited

U.S. PATENT DOCUMENTS

| | | | |
|---|---|---|---|
| 5,267,865 | 12/1993 | Lee et al. | 434/350 |
| 5,302,132 | 4/1994 | Corder | 434/156 |
| 5,303,042 | 4/1994 | Lewis et al. | |
| 5,306,154 | 4/1994 | Ujita et al. | |
| 5,311,422 | 5/1994 | Loftin et al. | |
| 5,318,450 | 6/1994 | Carver | |

FOREIGN PATENT DOCUMENTS

| | | |
|---|---|---|
| 9316454 | 8/1993 | WIPO. |
| 9321618 | 10/1993 | WIPO. |

OTHER PUBLICATIONS

Live Video Link on the Internet Makes Global Learning a Reality, Information Today, vol. 10,No.6, pp. 20–21, Jun. 1993.

Takeuchi et al., "An Interactive Learning Environment of an Intellegent Tutoring System", *IEICI Transactions on Information and Systems*, vol. E77–D, No. 1, Jan. 1, 1994, pp. 129–137.

*Primary Examiner*—Robert A. Hafer
*Assistant Examiner*—John Edmund Rovnak
*Attorney, Agent, or Firm*—Gregory A. Welte; Gates & Cooper

[57] ABSTRACT

The invention concerns computer-assisted education, in which a school curriculum is stored in computer repositories. A learning profile is maintained for every student, which indicates the student's capabilities, preferred learning style, and progress. Based on the profile, an Intelligent Administrator (IA) selects appropriate material for presentation to the student during each learning session. The IA then assesses whether the student has mastered the material. If not, the material is presented in a different way. If repeated different presentations fail to instill mastery, the IA establishes a video conference between the student and a professor.

4 Claims, 4 Drawing Sheets

AUTOMATED LESSON SELECTION AND EXAMINATION IN COMPUTER-ASSISTED EDUCATION

This is a continuation-in-part of Ser. No. 08/217,065, entitled "Automated Resources Management System," filed on Mar. 24, 1994, in which David M. Siefert is the inventor. This application is hereby incorporated by reference.

RELATED APPLICATIONS

Ser. No. 08/217,062, entitled "Ordering and Downloading Resources from Computerized Repositories," in which David M. Siefert is the Inventor, filed on Mar. 24, 1994.

Ser. No. 08/217,063, entitled "Automated Updating of Computer Software," in which David M. Siefert is the Inventor, filed on Mar. 24, 1994.

Ser. No. 08/217,066, entitled "Future Boolean Searching of Multiple Repositories of Resources," in which David M. Siefert is the Inventor, filed on Mar. 24, 1994.

Ser. No. 08/217,067, entitled "Security Aspects of Computer Resource Repositories," in which David M. Siefert is the Inventor, filed on Mar. 24, 1994.

Ser. No. 08/217,422, entitled "Launching Computer Program Upon Download of Data Created by Program," in which David M. Siefert is the Inventor, filed on Mar. 24, 1994.

Ser. No. 08/217,476, entitled "Computer System for Management of Resources," in which David M. Siefert is the Inventor, filed on Mar. 24, 1994.

Ser. No. 08/218,024, entitled "Multiple Repositories of Computer Resources, Transparent to User," in which David M. Siefert is the Inventor, filed on Mar. 24, 1994.

Ser. No. 08/334,775, entitled "Computer-Assisted Education," in which David M. Siefert is the Inventor, filed concurrently.

Ser. No. 08/334,776, entitled "Computerized Repositories Applied to Education," in which David M. Siefert is the Inventor, filed concurrently.

Ser. No. 08/334,777, entitled "Computer-Assisted Education Using Video Conferencing," in which David M. Siefert is the Inventor, filed concurrently.

Ser. No. 08/334,779, entitled "Selecting Teaching Strategies Suitable to Student in Computer-Assisted Education," in which David M. Siefert is the Inventor, filed concurrently.

Ser. No. 08/334,780, entitled "Computer-Assisted Curriculum," in which David M. Siefert is the Inventor, filed concurrently.

These Applications are hereby incorporated by reference.

The invention concerns computerized systems used for education.

BACKGROUND OF THE INVENTION

Many school systems have become highly centralized. Large schools have evolved, which serve wide geographic areas. The geographic area covered by some schools is so wide that certain students must make a round trip of one hundred miles, or more, to attend classes.

One benefit of a large, centralized school is that a vast, diverse curriculum can be offered. It is desirable to offer the diverse curriculum, without imposing the long-distance travel on students.

OBJECTS OF THE INVENTION

An object of the invention is to provide a system which allows students to attend school, yet remain at home.

An object of the invention is to provide formal education at geographic distributed sites.

Another object of the invention is to provide formal education by the use of computers, using the existing public-access telephone system.

SUMMARY OF THE INVENTION

In one form of the invention, a system of computers store lessons which are transmitted to computers used by students. At intervals, the invention assess the students' progress, and selects appropriate lessons for the student at the time.

DETAILED DESCRIPTION OF THE INVENTION

Highly Simplified Overview

Figure 1:
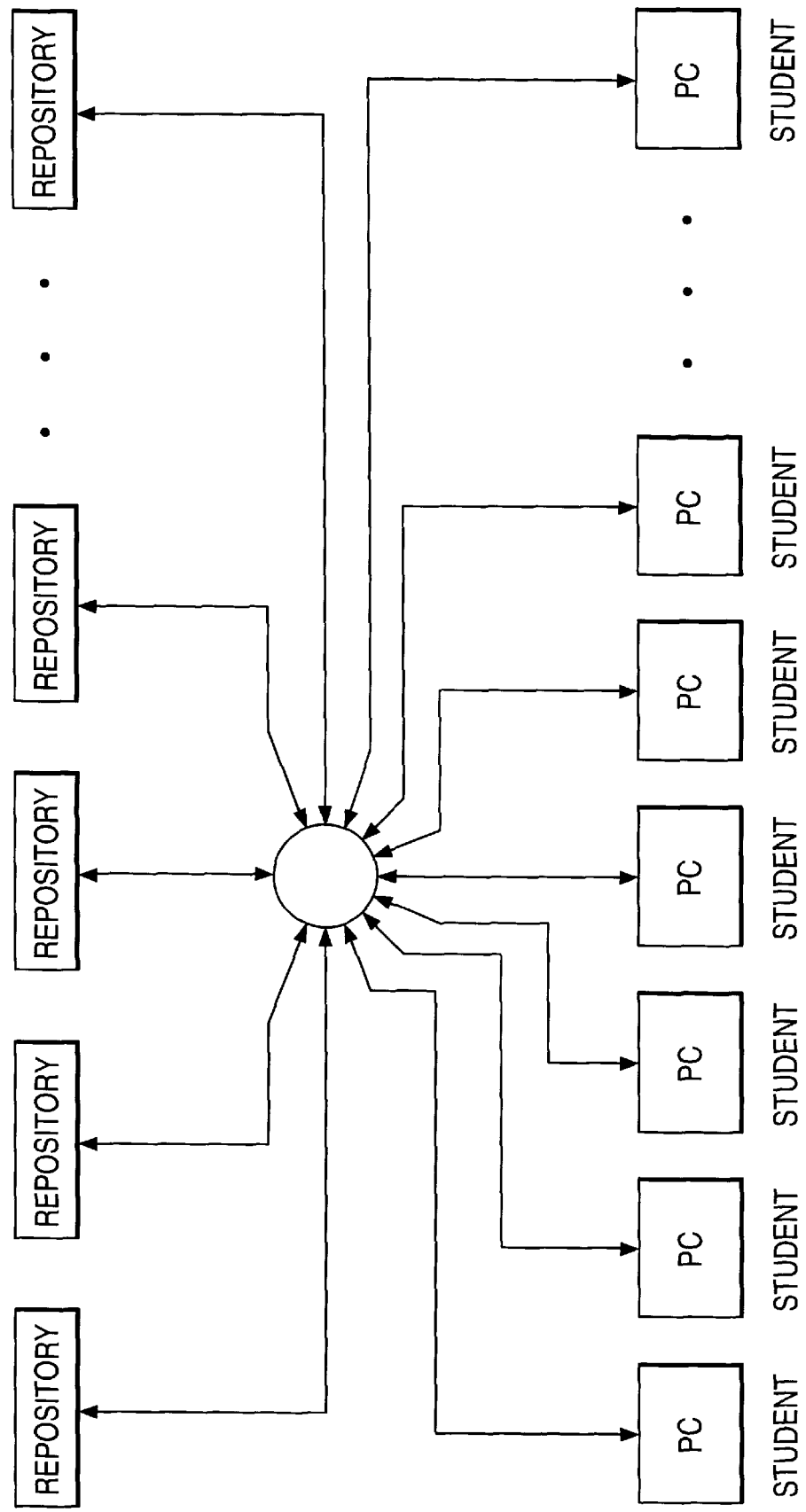
FIG. 1 illustrates one conception of the architecture of CLS, by which any STUDENT can gain access to any REPOSITORY.

FIG. 1 illustrates a simplified form of one architecture which can accomplish the objectives of the invention. REPOSITORIES hold educational computer programs. Students obtain access to the programs needed, via the NETWORK indicated. The programs instruct the students in an interactive manner.

The students need not be present at the REPOSITORIES, but station themselves at convenient locations, such as their homes, thereby eliminating the need to travel to a physical facility to attend classes.

The Educational Programs

The teaching programs themselves are commercially available, and new programs will be developed as systems such as the present invention become more widely implemented.

Programs which test students, in order to determine the students' master of material, are also commercially available.

The invention provides several highly innovative features which significantly enhance the effectiveness of these teaching programs and testing programs.

Profiles

One is that a PROFILE is generated for each student. PROFILES are discussed in the Related Applications. As adapted to the present invention, the PROFILE is, in simple terms, a description of (a) the present educational status, (b) the educational needs and (c) the educational capabilities, of the student.

Educational Status

Educational status refers to the student's present position in the student's educational career. For example, third-month, secondary-school freshman is one status.

The invention uses the educational status in deciding what material to present the student at a given time, as discussed more fully below.

Educational Needs

Educational needs refer to the instruction needed by the student at the time, which is largely determined by the student's curriculum. For example, the lessons needed by a college sophomore having a curriculum of college chemistry, with emphasis on organic synthesis, are known.

Educational Characteristics

Educational characteristics refer to the manner of teaching to which the student best responds. That is, the invention identifies learning characteristics of each student, and presents material in a manner compatible with the characteristics.

As a simple example, some students can understand the Pythagorean Theorem directly from its mathematical statement, namely, $$\text{hypotenuse}^2 = \text{side1}^2 + \text{side2}^2.$$

Other students do not obtain information from such an abstract statement, and must see the Theorem applied to specific examples before they understand it.

The preferred learning styles are ascertained by a combination of student-counsellor interviews, computer-assisted examination of the student, and standard psychological assessment.

The invention uses the PROFILES to select material to present to the student during each session. The PROFILE is updated, if required, at each students' learning session, to indicate progress made during the session. This updating is automatic, and done non-intrusively.

Different Presentation of Given Lesson

The invention includes educational programs which present a given lesson in different ways, in order to accommodate the fact that different students assimilate material in different ways. This collection of different presentations allows implementation of two teaching approaches.

1. Different Presentations of SAME Lesson for DIFFERENT Students

As discussed immediately above, because different students have different learning characteristics, the invention selects a suitable manner of presentation from the collection, based on the learning characteristics of the student. The selection is made based on the PROFILE.

2. Different Presentations of SAME Lesson for SAME Student

The collection of presentations can be used to offer different presentations to a given student, if the student fails to master a lesson when presented the first time. Three reasons exist which indicate that this approach may be desirable.

One, it is expected that a given student does not maintain constant learning characteristics at all times.

Two, the characterization of learning style of a student is not a perfect science. Thus, even if the learning characteristics never change, it is not clear that a perfect match can always be made between a style of presentation and the learning characteristics of the student.

Three, even if the classification of learning style becomes perfected, the subject matter of some lessons may not be amenable to the learning style preferred by the student. For example, there exists a "left-brain, right-brain" conception of human thinking, wherein the left-brain is believed to manage logic, and the right-brain manages creativity and imagery.

For a "right-brain" student, there may exist no directly compatible teaching strategy for explaining "left-brain" subject matter. For instance, there may be no perfectly compatible teaching strategy to explain the principles of artistic color theory to a right-brain student undertaking a curriculum of nuclear physics.

Therefore, the invention presents a given lesson in successive, different ways, if the student does not master the lesson the first time.

Subject Matter Expert

If a student fails to demonstrate mastery of a lesson after a prescribed number of attempts, the invention establishes a video conference between the student and a SUBJECT MATTER EXPERT. The SUBJECT MATTER EXPERT is a consultant who is expert in the subject matter of the lesson causing difficulty. The video conference allows the SUBJECT MATTER EXPERT to identify the difficulties encountered by the student, and to offer coaching.

Establishment of the video conference is allowed by commercially available systems, such as the CLS system described below, and also described in the Related Applications.

CLS places no geographic restriction on the location of the SUBJECT MATTER EXPERT, except that the expert must be able to establish a communication link with the system. With no such restrictions, the SUBJECT MATTER EXPERT can be located anywhere in the world. This feature allows Subject Matter Experts of the highest caliber to be obtained, because such experts are a rare species, and not easily located.

Intelligent Administrator

An INTELLIGENT ADMINISTRATOR, IA, taking the form of a system of programs and computer objects, organizes the instructional activity. The IA does the following: examines the PROFILE of each student, selects the proper lessons for each session, administers examinations to the students, updates the PROFILE, and patches up the student with a SUBJECT MATTER EXPERT when necessary. In addition, the IA assesses the performance of the student, in a continual and non-intrusive manner.

The IA itself can call upon its own SUBJECT MATTER EXPERTS when it encounters a condition which its programming and organization cannot handle.

Greater Detail Concerning Invention

Invention Utilizes Commercially Available Equipment

The invention can be utilized in conjunction with the information management system sold under the trade name "Continuous Learning System" (CLS) and available from AT&T Global Information Solutions Company, Dayton, Ohio. CLS provides the systems to allow the remote access and video conferencing described above.

This discussion will explain some of the relevant features of CLS, and will then consider in greater detail the PROFILES and the IA.

1. CLS Uses Multiple, Linked Computers. In CLS, users interact with micro-computers, such as the well-known, highly advanced, and inexpensive Personal Computer (PC). The micro-computers are located at locations of the users' preference, such as their homes, offices, or vehicles. The micro-computers connect with CLS by data links, such as private or public data networks, or by commercially available telephone channels.

The links can take the form of traditional, hard-wired telephone channels, or wireless links, such as provided by cellular telephone service.

2. CLS Has Vast Storage Capability. Entire Curriculum can be Stored. CLS acts as a storage facility for materials which are generically called RESOURCES. RESOURCES can be classified into two types, namely (a) those which are downloadable and (b) those which are not. Two examples of downloadable RESOURCES are (a) a computer program, and (b) a file stored on a mass storage medium, such as a disc- or tape drive. Two examples of RESOURCES which are NOT downloadable are (a) a 35 mm film and (b) a book, in paper format.

Static and Dynamic Resources

RESOURCES consist of anything which has potential value in terms of recovering knowledge. RESOURCEs include, for example, information which can be downloaded, such as data, files, computer applications, computer-managed instruction. RESOURCES also include SYSTEMS, such as the commercially available information services known as CompuServe and Prodigy, because these SYSTEMS allow recovery of knowledge. Subject Matter Experts are also RESOURCES. RESOURCES can be classified in a different way, namely, as either static or dynamic. The RESOURCES discussed above are of the static type, because, at the time of recovery, they are pre-existing.

Dynamic RESOURCES are not pre-existing at the time of recovery, but come into existence at the time of recovery. For example, when television news media cover an event in real time, such as the State-of-the-Union Address of the President of the United States, information contained in the Address becomes available for recovery (if the news media is linkable to CLS or an equivalent). The information was not pre-existing, but came into existence at the time recovery became possible. (Of course, there is an extremely short time delay between the time of the Address and time recovery becomes possible. This time is considered negligible, and does not render the Address pre-existing.)

Non-Downloadable RESOURCES Can be Used

In general, it is expected that the invention will utilize downloadable RESOURCES primarily. However, because the vast storage ability allows the invention to hold a curriculum of truly immense proportions, it is expected that many educational courses will refer to materials which cannot be rendered into downloadable format, for reasons such as copyright laws. For such courses, the automated retrieval capabilities of CLS become significant. These features are described in the Related Applications.

Storage facilities in CLS are called REPOSITORIES. A REPOSITORY includes one micro-computer, or a group of micro-computers at a single location. (REPOSITORIES can also contain more advanced computers, such as main-frames and mini-computers.) The REPOSITORIES themselves can be distributed over an extremely wide geographic area; they can be spread world-wide. As a result, the RESOURCES will likewise be widely distributed, because they are stored in the REPOSITORIES.

However, despite this geographically distributed storage of RESOURCES, and despite the vast total storage capability of the overall system, CLS allows the user to deal with all downloadable RESOURCES as though physically present on the user's computer. That is, in effect, the user sees all RESOURCES, no matter where located, as though located in the storage devices of the user's own computer.

Therefore, several school districts can maintain their own REPOSITORIES. However, because the REPOSITORIES are linked by CLS, to the student, all RESOURCES appear to be located at a single, convenient location. (Of course, under CLS the student can, if desired, ascertain the fact that the RESOURCES reside in different REPOSITORIES, and are not, in fact, located at a single place.)

3. CLS Has Database Characteristics. CLS can be viewed as a type of database, but with several distinguishing features. One, the storage capacity of CLS is, for practical purposes, without limitation. One reason is that the architecture of CLS centers upon the PC. Expansion of storage in PCs is simple and inexpensive. Further, additional PCs can be added to CLS with little or no software modification: CLS is designed to accommodate this expansion. Stated in other words, the PCs are directly concatenable. In principle, there is no practical limit to the amount of storage available.

A second feature is that CLS allows a user to see a list of RESOURCES, to which the user is allowed access, and allows the user to select a RESOURCE. If the RESOURCE is a computer program, or other object that runs on a processor, CLS retrieves the selected RESOURCE, and launches it.

In the present context, this feature is important, because the RESOURCES include educational computer programs, as discussed below. When the student, or the INTELLIGENT ADMINISTRATOR, selects a RESOURCE, CLS automatically launches it, if possible.

4. CUSTODIAN of Each REPOSITORY Controls Contents (ie, Resources) of REPOSITORY, and Controls Access to RESOURCES Contained within the REPOSITORY. The person, or agency, having physical custody of each REPOSITORY has the power to load RESOURCES into storage within the computers of the REPOSITORY. Thus, the CUSTODIAN controls the contents of the REPOSITORY. Further, CLS allows the CUSTODIAN to designate the parties who shall be granted access to each RESOURCE.

Under the present invention, a local school district, for example, will control the RESOURCES, which contain the curriculum for the students. This school district will control access to the RESOURCES, and can grant access to students of other districts, if desired.

5. Each RESOURCE Has a PROFILE. A "RESOURCE PROFILE" is a collection of information which describes a RESOURCE. The PROFILE contains, for example, a) a descriptive title;
 b) the REPOSITORY containing the RESOURCE;
 c) information about physical characteristics of the RESOURCE (media type, such as computer disc, video tape, paper book, etc.);
 d) relevant dates, such as date of loading into the REPOSITORY;
 e) security-related information;
 f) and so on.

The PROFILEs are somewhat analogous to the cards of the card catalog of a library. In a library, the books, and other media, such as film and video tape, constitute RESOURCEs. In CLS, the RESOURCEs include a more diverse array of media types than a library, but the PROFILEs serve a function similar to that of the cards.

Adaption of CLS to Education

A LEARNING PROFILE is generated for each student, in a manner discussed in greater detail below, and these are called LEARNING PROFILES, to distinguish them from RESOURCE PROFILES, which describe RESOURCES, and not students. The LEARNING PROFILEs conform to the PROFILEs used by CLS for RESOURCEs generally. The student-PROFILEs contain information about the student which is relevant to the INTELLIGENT ADMINISTRATOR. The LEARNING PROFILES can be arranged to follow the students through their entire careers, subject to legislation regarding privacy of the content of the LEARNING PROFILES.

LEARNING PROFILE Creation

The LEARNING PROFILE can be created in numerous different ways. For example, standard psychological testing techniques and personal interviews can allow a counsellor to generate a LEARNING PROFILE, which is loaded into CLS.

As another example, CLS itself can administer known, standard tests, and develop the LEARNING PROFILEs without intervention of a counsellor. In practice, the LEARNING PROFILE generation will probably be undertaken in a procedure which is a hybrid of these two examples. At the end of the Specification, a discussion is given regarding learning strategies, and contains additional material relevant to LEARNING PROFILE generation.

PROFILE Content

The LEARNING PROFILES contain information such as the following:

1. Student's curriculum, or "major." One benefit of the invention is that all students, at all levels, can be given individualized attention. Even very young students can be given a "major" if desirable.

That is, in present educational systems, younger students, such as those in the earlier years of primary education, are usually not given specific curricula. For these students, education tends to be non-specialized and generic; all students tend to be given similar courses.

The invention allows education to be tailored to individual needs, at all educational levels. One reason is reduction in cost: the invention contains the vast array of lessons needed to provide individual attention. There is very little added cost in making the individual attention available to additional students.

2. Preferred teaching strategies. At the end of the Specification, teaching strategies are discussed. In general, different teaching strategies are available for most, if not all, subjects. As an example, the Suzuki method of teaching piano illustrates one teaching strategy.

Under this strategy, students listen to recordings of piano music played by a master, and then imitate the master by playing the music themselves, while reading sheet scores of the music. While the student plays, a teacher coaches the student. Right from the start, the student plays complete (though simple) songs.

In contrast, under another method, the student does not initially study complete songs, but instead studies the components of songs, namely, single notes, their duration, their intensity, and so on.

Both methods have their advocates and critics. Without considering the debate itself, it seems reasonable to assume that neither method is perfectly suited to all students.

The invention, if called upon to teach piano, would recognize this fact. Under the invention, each student's PROFILE contains an indication of the student's preference, such as for the Suzuki method, or another approach, and the student is instructed accordingly.

3. Student's present standing. The PROFILEs contain a statement of the student's previous accomplishments, which indicate the student's present standing, or status. From a lifetime viewpoint, the present standing refers to the present educational level of the student, such as fifth grade, or college sophomore.

From a more focused viewpoint, the present standing refers to the courses presently being taken, and the progress made in each. For example, in a high-school course in algebra containing 60 lessons, the present standing will indicate the number of lessons successfully completed.

The present standing provides specific information for CLS to use in determining what material to present to a student during a given session.

The present standing is preferably ascertained in a non-intrusive, transparent manner, based on a demonstration of level of competency by the student. Level of competency can be determined, in many, if not most, subjects, by assessment in a hierarchical fashion. For example, assume that a given student is undertaking a course in calculus. Calculus textbooks present material in a sequential manner, in the sense that mastery of earlier material is required as a prerequisite to understanding later material. A simple assessment of level of competency of a student can be done by determining in which chapter of the textbook the student's mastery ends.

As another example, assume that the student is undertaking a course in gas turbine engine maintenance. Many maintenance procedures involve sequences of events, wherein the order cannot be changed. A student's level of competency can be assessed by determining how much of a given sequence the student has mastered.

It is significant that the source of a student's knowledge which determine the level of competence is not germane to the assessment process. The assessment process seeks to determine a level of performance, or level of competency, because the goal of the overall education process is to enhance ability to perform.

4. Significant personalized information. This is perhaps a sub-class of preferred teaching strategies. This section contains information about unique attributes of the student which either present difficulties in teaching the student, or facilitate teaching.

For example, a student who has a hearing impairment may require special lessons, as compared with a student having hearing abilities within the norm of a standard population. As another example, a student who has a photographic memory may find that learning the vocabulary of a foreign language is an extremely simple task.

The PROFILEs, in general, facilitate the IA's matching of the students' needs with the RESOURCEs which are suited to those needs. The PROFILEs contain information such as that described above, plus additional information required, to accomplish this goal.

RESOURCEs

In general, RESOURCEs include all materials made available by CLS. In the context of education, RESOURCEs include a significant number of computer programs which teach. There are numerous types of such programs, and hundreds, and perhaps thousands, are commercially available today.

Intelligent Administrator

The Intelligent Administrator (IA) is a system of computer programs, which can operate alone, or in conjunction with an SME or other consultant. The IA does the following:

1. Based on PROFILEs, the IA assesses a student's current standing within a curriculum, and determines the skills required for the student's present advancement.

For example, the IA may determine that a given student stands at the beginning of the junior year in high school, and that the student has successfully completed 12 of 60 lessons in analytic geometry. Based on this assessment, the IA decides that lesson number 13 should be given next.

2. The IA locates the RESOURCEs necessary for the required lessons. In this example, the IA would locate lesson 13, identified above. Lesson 13 will probably reside in the local school district's REPOSITORY, but, because of the capabilities of CLS, lesson 13 can reside anywhere within the overall CLS system.

Since multiple teaching strategies are available, and are used if the first-chosen strategy does not produce results, the IA locates the multiple RESOURCEs which represent the multiple strategies. (In the general case, these RESOURCEs will not be located in the same REPOSITORY, although they can be.)

3. The IA assesses whether the RESOURCEs are successfully imparting the knowledge desired to the students. This assessment can be done by using known, standardized testing approaches, given by computer.

Additional Considerations and Characterizations

1. Different presentation of a given lesson was discussed above. In the section entitled "Teaching Strategies Generally," located below, references are discussed which elaborate on the concept of different learning behavior of different students. These references provide the general principles of creating different presentations.

A more rote-minded approach would be based on the fact that different teachers themselves probably make different presentations of a given topic. Therefore, one approach to generating the different presentations is to assign a number of teachers, say ten, the task of each writing a lesson explaining a topic. The ten different lessons will provide ten different presentations for the collection of presentations.

2. The invention measures the rate of learning of the student, and prompt the student to end a lesson when the rate is seen to significantly falter. For example, suppose that a student is studying a subject which is memorization-intensive, such as biology. The lessons can be arranged such that learning is presented in groups of twenty concepts. After each group of twenty is presented, an assessment of the student is done.

The IA logs the time required by the student to learn each group. When the time falls below the best time by a predetermined amount, say thirty percent, the IA attempts a different teaching strategy. If that fails, after a predetermined number of attempts, then the IA patches the student into a Subject Matter Expert.

3. One form of the invention includes the following components:
   a) CLS.
   b) The educational programs, including the different presentations of a given subject, which are commercially available, or can be developed based on known principles.
   c) PROFILES, which are developed according to the teachings of this Specification.
   d) The INTELLIGENT ADMINISTRATOR, which primarily
      i) selects different teaching strategies, based on
         A) profile of student and
         B) success of previous lessons.
   The details concerning implementation of the INTELLIGENT ADMINISTRATOR are known, given the mission of the IA as described herein.
   e) The SUBJECT MATTER EXPERTS.

4. The video conferencing feature of CLS allows a SUBJECT MATTER EXPERT to teach small groups of students, and the students to confer with each other. As an example, after students in an ordinary school take an examination, many of them congregate and compare opinions on the exam. Under the invention, similar behavior is possible, but by way of video conferencing.

5. The distributed aspect of learning is important. A student can undertake learning at any location, provided a Communicator is available to link with CLS, or an equivalent.

For example, a newly hired business person must learn certain internal procedures followed within the hiring organization, such as filling out expense account forms. It is known in the art how to write a program which explains how to fill out such a form. (In a highly simplistic sense, the program can merely repeat the text of written instructions which undoubtedly have been written.)

This instructional program is made available via CLS. The business person can now learn how to fill out the expense "form," using a Communicator, such as a PC and a modem, at any desired location, such as in a waiting lounge at an airport. Then, having mastered the procedure, the person can fill out needed "forms" at any location whatsoever, provided a link to CLS, or to an equivalent, is available.

6. Two learning styles are discussed herein, namely, "holistic" and "linear." There exist other distinctions in approaches to explaining subject matter to a student. Three examples are the following.
   A. Some students prefer to read material; others prefer to hear an explanation of material spoken by a teacher.
   B. Some students prefer to have material presented in a verbal format, either in writing (which is read) or in speech (which is heard). Other students prefer to have material presented in graphical format. A good example of this distinction is found in *Gray's Anatomy*. Two versions exist: there is a version which is primarily textual, and contains few pictures. There is another version which is primarily graphical, and is replete with pictures.
   C. When technique is being taught, some students prefer to see a demonstration; others prefer to hear a description of the principles of that demonstration.

Profiles and Learning Strategies

One approach to Developing a Learning Profile

The invention obtains necessary data from the student, such as name, age, and previous learning completed in school. This information allows the AI to place the student in the proper grade.

The invention then ascertains the student's preferred learning style through an entry adventure. (Different adventures will be given to students of different age, so the age, or last grade completed, will influence the choice of entry adventure presented to the student.)

Each student can take a new entry adventure every year, to ascertain whether the learning characteristics have changed. Also, since girls and boys differ in their intellectual and social development, and since the entry adventure should catch their interest and create enthusiasm for the coming year's studies, different versions will be used for boys and girls.

In this adventure students solve a problem, or pursue an adventure. The choices made indicate their comprehension speed and favored style of learning.

Learning Speed

The student's learning speed can be measured by how long it takes a student to solve a given problem, or to perform an assigned task. Several problems will be embedded in the adventure; the problems will provide information and then require the student to apply it in situations which require different levels of complexity and integration. The invention can tally the total time elapsed for the student to solve the problems, and compare the total to the norm for that grade in the student's school district or region. (This learning speed measure is different from IQ measurement; research has shown that even above-average students differ in their learning speed.)

Physiology Can Correlate with Learning Speed

There has been some research pioneered by W. C. Sheldon at Harvard in the 1930's and 40's, on the correlation between body type and learning characteristics. (Smith, 1949, pp. 310–320). Sheldon delineated three body types, based on the embryonic source of tissue: ectomorph (tall and skinny), mesomorph (compact and muscular) and endomorph (large and or overweight).

More recently, Chopra has pointed out that a particular traditional medical system, of interest to him, also defines three basic physiological types in a manner similar to Sheldon's. (Chopra 1990, pp. 33–41).

According to Chopra, some students (endomorphs) learn slowly but retain knowledge quite well, and others who learn quickly tend to forget just as quickly (ectomorphs).

Therefore, physical examination of students may provide data indicative of learning characteristics. Further, the invention can be used to validate, or derive, correlations between measured physiological parameters and learning behavior. When correlations are found, the identification of learning characteristics can be made based on the physiological parameters, which are presumably easier to ascertain.

For example, a standard set of physiological parameters of students are measured and placed into the PROFILES. Known medical and public health techniques list these standard parameters. Then, over time, the INTELLIGENT ADMINISTRATOR looks for correlations between learning speed, preferred learning style, etc., and the parameters. Known statistical techniques provide the correlation.

When correlations are found, then the measured physical parameters are used to indicate the learning characteristics of subsequent students, rather than testing for the characteristics themselves.

Preferred Style of Learning

There is much written in educational psychology about learning styles, usually referred to as "cognitive styles." Cognitive style, or learning style, refers to the way in which a student prefers to organize his or her thought processes—his or her preferred mode of thinking. There are a few different approaches which could be used, but by far the largest body of research shows that learning style preferences usually fall into one of two groups, stereotyped as artistic or scientific thinking.

Hunter Breland, a research psychologist for the U.S. national Educational Testing Service, asserts that "the most widely examined" cognitive style is the continuum of field dependence/independence (Breland, 1981, p. 38). The basic difference between field dependent and field independent problem-solver is that the former tend to depend on cues from the environment to solve the problem, and the latter tend to rely more on internal cues. He quotes a study by Witkin et al. (1977) which indicates that field-independent college students tend to major in the sciences while the more field-dependent students gravitate toward majors in education (p. 38).

Entwistle (1981) writes about Pask's research categorizing students as "holist" or "serialist." The holist learning style, called comprehension learning, involves "building descriptions of what is known." The serialist style is called operation learning, "the facet of the learning process concerned with mastering procedural details." (p. 93)

When Pask assigned students to either a matched or mismatched learning situation, the results were notable: the matched students were able to answer most of the questions regarding the lesson, while the mismatched students generally scored less than 50% correct. Entwistle's conclusion is that although teachers will never provide as extreme an example of mismatching, there is evidence in primary education to support the fact that different teaching methods are effective to different degrees for students with different personality characteristics.

There has been other research indicating that students differ in their preference of inductive or deductive reasoning. Another area of research has been whether students prefer to use what are commonly considered "right brain" skills (creativity, association, imagery, analogies, spatial relationships, feelings) or "left brain" skills (logic, sequence, organization, structure, procedure).

All of these approaches have the same theme: the basic question is whether a student prefers to use logical, procedural, linear thought processes or holistic creative (associative), spatial processes. Most authors point out that many learners are flexible and can move relatively easily between the two cognitive styles. And, as most every author points out, everyone must use both approaches at different stages in the solution of a problem, and the ideal is to be able to function well in both (e.g., an architect must think creatively to plan a house, but then he must also know clearly the sequence of building, or the house will not materialize).

This computer program can assess whether one of these learning styles is preferred on the basis of choices made in the context of the entry adventure. If a student is reasonably comfortable with both, then he or she will be branched into the standard curriculum, which is a mix of both styles. If, however, a student displays a dear preference for one style, he/she will be branched into a curriculum which favors explanations and examples in that style.

Delivering the Content and Mastery of the Material

The curriculum must also be structured from sound learning principles. There are a few different schemes for classifying the necessary conditions for learning but Gagne's learning outcomes and conditions of learning are the most thoroughly developed and therefore the most useful in developing computer-based instruction.

Gagne classified all possible learning outcomes into five performance categories: intellectual skills, cognitive strategies, verbal information, motor skills, and attitudes. Examples of these, along with their subcategories, are shown in Table 3.1, below, taken from Gagne's Essentials of Learning for Instruction (1975, p. 68). These are useful for design purposes in that they describe capabilities which apply across all subject matter areas. According to Gagne, certain conditions are necessary for learning each of these types of outcomes. Some conditions are "internal" and some are "external."

The internal conditions define prerequisite knowledge or skills, and external conditions define certain aspects of the instruction; the invention should be concerned with both. The following descriptions of internal and external conditions required are derived from Gagne's The Conditions of Learning (1977, pp. 25–49).

For the learning of intellectual skills, the primary internal condition is that the student have prerequisite skills which provide the components of the new skill being learned. External conditions are often in the form of verbal directions which guide the combination of simpler skills into a new integrated whole.

In terms of verbal information, internal requirements are that the learner have a good mastery of linguistic rules and vocabulary in order to understand statements presented, and he or she must also have previously existing "cognitive structures" (p. 40), or structures of meaningfully organized information which will give meaning and context to the new material presented.

One external condition is stimulation of the appropriate cognitive structure (usually in the form of an advance organizer). Another is informing the learner of the objective of the learning; this focuses the learner's attention. A third may be repeated hearing or reading of an informational passage; most modern theories concur that more information is assimilated with each repetition (p. 40).

Cognitive strategies refer to how the learner organizes his or her own thought processes (attention, learning, remembering, thinking). The internal conditions required are memory of intellectual skills and verbal information previously learned which relate to the new task presented. The most effective external condition is evidently frequent opportunities to practice strategizing. According to Gagne, practice refines and improves the strategies.

TABLE 3.1

Five Major Categories of Human Capabilities,
Representing the Outcomes of Learning with Examples of Each

| Learning Outcome | Example of Human Performance Made Possible by the Capability |
|---|---|
| Verbal Information | Stating the provisions of the First Amendment to the U.S. Constitution |
| Intellectual Skill | Showing how to do the following: |
| Discrimination | Distinguishing printed b's from d's |
| Concrete Concept | Identifying the spatial relation "below" |
| Defined Concept | Classifying a "city" by using a definition |

TABLE 3.1-continued

Five Major Categories of Human Capabilities,
Representing the Outcomes of Learning with Examples of Each

| Learning Outcome | Example of Human Performance Made Possible by the Capability |
|---|---|
| Rule | Demonstrating that water changes state at 100 C. |
| Higher-order Rule | Generating a rule for predicting rainfall, given conditions of location and terrain |
| Cognitive Strategy | Originating a novel plan for disposing of fallen leaves |
| Attitude | Choosing swimming as a preferred exercise |
| Motor Skill | Executing the performance of planing the edge of a board |

The learning of motor skills (e.g., courses in drafting, carpentry, etc. in the curriculum) requires the student to master in overall sequence and pattern of movements. Especially in the case of a complicated procedure (e.g., constructing a chair) sometimes the sequence must be learned in parts, which are then put together. The main external condition required is repeated practice, which makes performance more and more smooth and predictable.

Attitudes are expressed behaviorally; therefore one internal condition for learning new attitudes is that the learner must have mastered whatever skills or knowledge the behavior requires (e.g., knowledge of the rules in order to enjoy playing chess, etc.) Another internal condition is that the learner must have admiration and respect for people who are seen doing the behavior; this is called "human modelling" (p. 46.) The only external conditions which seem to be effective are that either the learner himself or a human model experiences the effects of an action as "good" or "bad."

A summary of the external conditions which facilitate learning is shown in Table 4.2, from Essentials of Learning for Instruction (Gagne, 1975, p. 93). One way the invention will ensure mastery will be that the entire curriculum will be designed in accordance with these sound and widely accepted learning conditions of Gagne.

The invention has two ways to help a student who demonstrates through his or her score that internal conditions of learning are deficient (e.g., prerequisite skills or knowledge are lacking). The first is that a HELP screen is always available at the student's request. To avoid boredom or frustration, a student will be able to access a HELP screen at any point during an instructional unit. This first level HELP screen will allow the student to:

change skill levels (learning speeds)

change learning styles request another explanation request review of any previous material request a conference with a teacher Depending on the option chosen, the invention will then adjust a student's learning speed up or down, give another explanation and examples (one in the same learning style and one in a different learning style), review specific sections in the unit (or all previous information in the unit), or connect the student to a live video teleconference with a teacher. Access to this HELP screen is optional, and a student may choose it once, several times, or not at all during a unit of instruction.

TABLE 4.2

A Summary of External Conditions Which Can
Critically Influence the Processes of Learning

| Class of Learning Objective | Critical Learning Conditions |
|---|---|
| Verbal Information | 1. Activating attention by variations in print or speech<br>2. Presenting a meaningful context (including imagery) for effective coding |
| Intellectual Skill | 1. Stimulating the retrieval of previously learned component skills<br>2. Presenting verbal cues to the ordering of the combination of component skills<br>3. Scheduling occasions for spaced reviews<br>4. Using a variety of contexts to promote transfer |
| Cognitive Strategy | 1. Verbal description of strategy.<br>2. Providing a frequent variety of occasions for the exercise of strategies, by posing novel problems to be solved. |
| Attitude | 1. Reminding learner of success experiences following choice-of particular action; alternatively, insuring identification with an admired "human model"<br>2. Performing the chosen action; or observing its performance by the human model<br>3. Giving feedback for successful performance; or observing feedback in the human model |
| Motor Skill | 1. Presenting verbal or other guidance to cue the learning of the executive subroutine<br>2. Arranging repeated practice<br>3. Furnishing feedback with immediacy and accuracy |

Students who score average or above average will be able to:
  go to the next unit
  change subjects
  Request a live conference with teacher
  Log off for now.

The conference option with SUBJECT MATTER EXPERTS makes it possible for a student who has mastered the unit but who is curious about tangential or deeper levels of the material to ask questions while his or her interest is still fresh. If a teacher needs to research the answer, the student could find the answer on the system at log on the next day, or CLS can page the student with a notice of the answer's availability.

A student who scores below average on the unit would automatically be given a diagnostic check. This is the second way in which the system can assess lack of prerequisite skills, as well as other problems. The diagnostic check will be in the form of a question (Did you use the HELP screen during the unit?) and a menu for the student to choose from:
  Too easy
  Too hard
  Not straightforward enough (linear-biased learners will tend to think this about a curriculum that is too holistic)
  Explanations seem incomplete (holistic-biased learners will tend to think this about a curriculum that is too linear).
  Other
(Re-wording may be necessary for younger learners, but the idea will be the same.)

The computer system will automatically process the diagnostic results and adjust the curriculum accordingly. If the student requests, or checks "Other" he/she will be connected with a teacher for a live teleconference. After this diagnostic step, the student will then be given a menu screen with the choices:
  further study
  change subjects
  log off If the student chooses to either change subjects or log off, the computer will automatically place him at the beginning of customized remediation for this unit the next time this subject is requested. If the student chooses further study, he will begin the customized remedial content for the unit. This will include new explanations, examples, and practice situations.

When the remedial unit is complete, the score is displayed, and the above loop is repeated. If the student's score is still below average, he should automatically be connected with a teacher for a conference.

The teachers who work with this system will need to have Teachers' Guides containing all the content and resources in the system; there will be one of these for each grade level. They will need to know these well so that they can give assignments within the system to cover different problems that may arise.

The invention can be designed to provide many options, and the student's preferences can lead him through the curriculum to some extent; but the teachers' role will be critical in guiding the student through any rough spots, and being sure that the entire year's curriculum is completed on time.

Evaluation and revision must be built into the implementation of the system, especially for the first two years of use. Both the student and teacher should evaluate each unit of instruction as it is completed. The student could have a very short on-screen questionnaire immediately after the unit score is displayed, and the teacher could have the option of recording any comments about the content or design of the unit in the light of that student's experience.

Sample Lesson

Johnny, age 10, logs on to the system for the first time. The screen asks him to type his name, age, and assesses Johnny's last grade completed in school, which in this case was fourth grade.

The computer automatically branches Johnny into the fifth grade entry adventure for boys—the world of ancient Welsh legends, brought to life again through a time warp caused by the bizarre collision of incompatible electromagnetic fields on the exact spot where the Lord of Death was vanquished centuries ago. Death and his forces are abroad again, causing terrible damage. The challenge is to find him and trap him into returning to this spot, where the quantum mechanical laws of nature are normally strong enough to hold him fast.

To help Johnny solve this challenge, two guides provide assistance: one explains things using analogies and associations, and the other uses logical, linear, no-frills explanations. Johnny is frequently asked which of these guides he wants to ask for advice; in this way, the system can determine whether Johnny has a preferred learning style.

Johnny is given information of varying complexity at different points in the adventure. He is then asked to apply it in a number of situations. The computer tracks how many choices it takes Johnny to solve the problem, and compares this number to the norm. Assume that Johnny falls into the lower range.

Having finished the entry adventure, CLS identifies Unit 1 of the science curriculum. He first sees a short video clip of the science teacher, who introduces himself, explains how the unit is structured, and reminds Johnny that the HELP screen is available at any time, and that Johnny call talk with him in person by choosing that option. Then Johnny begins Unit 1.

The testing indicated that Johnny is a slower learner who is more comfortable with a holistic learning style, so he is branched into the holistic-dominant curriculum at the slower learning speed. First he sees and hears the story which acts as the advance organizer for the year's science study: there is a benevolent extraterrestrial messenger who has been given one year to convince his superiors that the earth should be spared from destruction.

Johnny's lessons examine selected features of the earth. At the end of each lesson, Johnny must provide information to the messenger which indicates whether the features studied have value, and should be preserved, so that the messenger can relay the information. The learning objectives for the year will be listed in this context. Then Johnny will see the tasks (learning objectives) that he must master for Unit 1 on Geology.

The learning outcomes expected in Unit 1 also verbal information, intellectual skills (all levels) and cognitive strategies. Gagne's critical learning conditions (e.g., presenting important ideas in context or building in occasional reviews of what has been learned) from Table 4.2 provide the structure for the stories, games, and adventures which comprise the unit of instruction.

Johnny works along in this highly—but transparently structured—learning environment until he doesn't understand something. At that point, he remembers that he can use the HELP screen. He chooses the HELP screen and indicates that he wants a further explanation. He is given two more explanations (one in each learning style) with examples and two practice questions at the end. His answer indicate that he understands, and he is branched back into the unit.

Later in the unit, he isn't sure that he understands something and he chooses "practice questions" under HELP 1. Still confused after those he asks for further explanation, which still doesn't clear up the problem. He is automatically branched into a live teleconference with the teacher, who sets him back on track, and tells Johnny how he can get more information on the subject if he wants, but tells him that now he can also go on if he prefers.

Johnny continues work in the unit until he has another question; he calls up the HELP screen and selects "further explanation." This time he understands well enough after the explanations to answer the two practice questions correctly, and he is then branched back into the unit.

Johnny finishes the unit with a test of his mastery of the learning objectives for the unit. Rather than calling it a test, the system presents it as his report for the extraterrestrial; it includes geological reasons why the earth, and the study of its geology, is important.

Johnny finishes the unit with an average score. He is asked to answer three short questions ("What did you like best about this unit?" "What did you like least . . . ?" "Any ideas for making it better?") regarding the appeal and effectiveness of the unit. Then he is given the options of going on to the next unit, changing subjects, talking with the teacher, or logging off.

Figure 2:
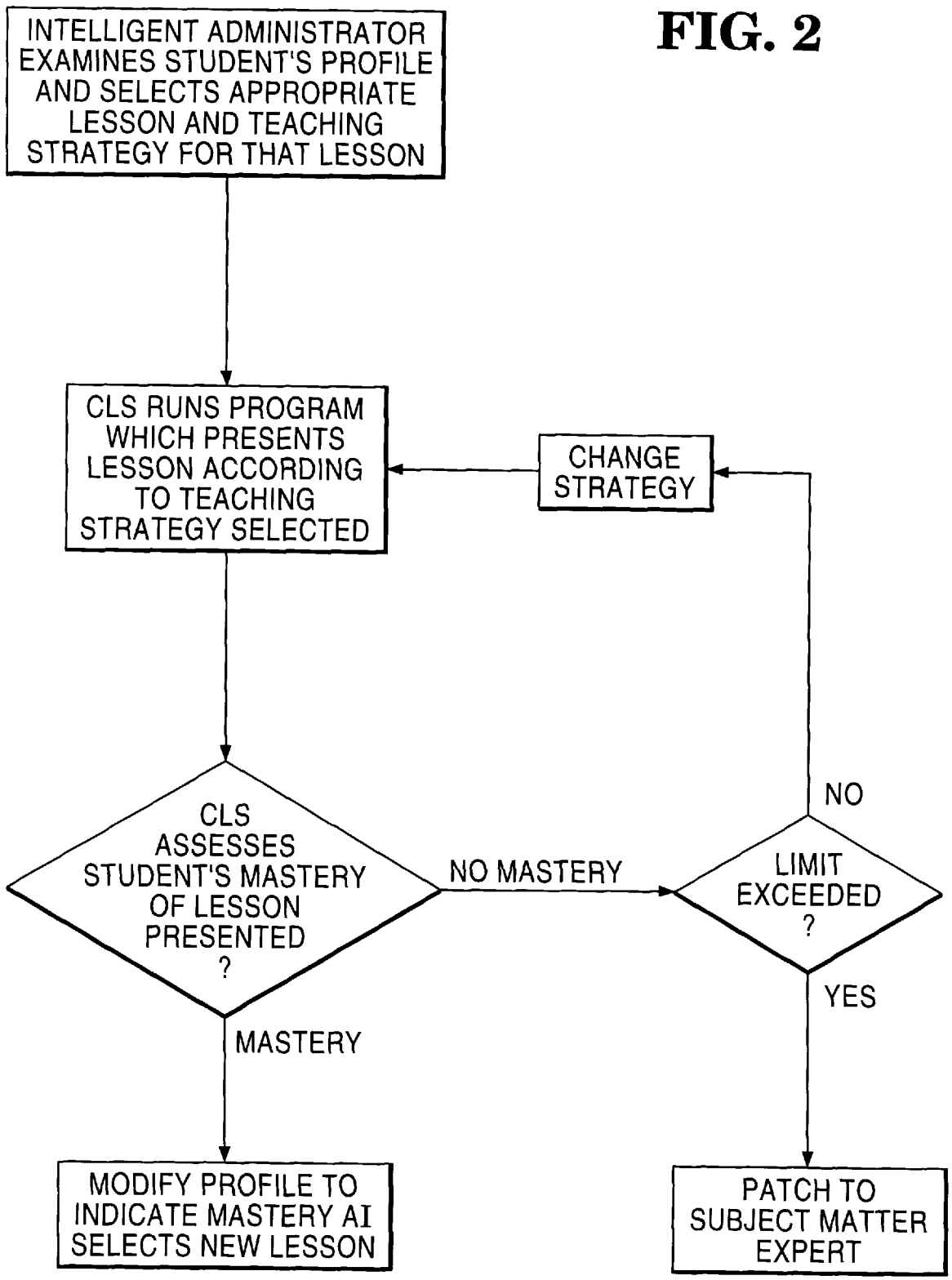
FIG. 2 illustrates a high-level logic flow of the presentation of a lesson under the invention.
Figure 3:
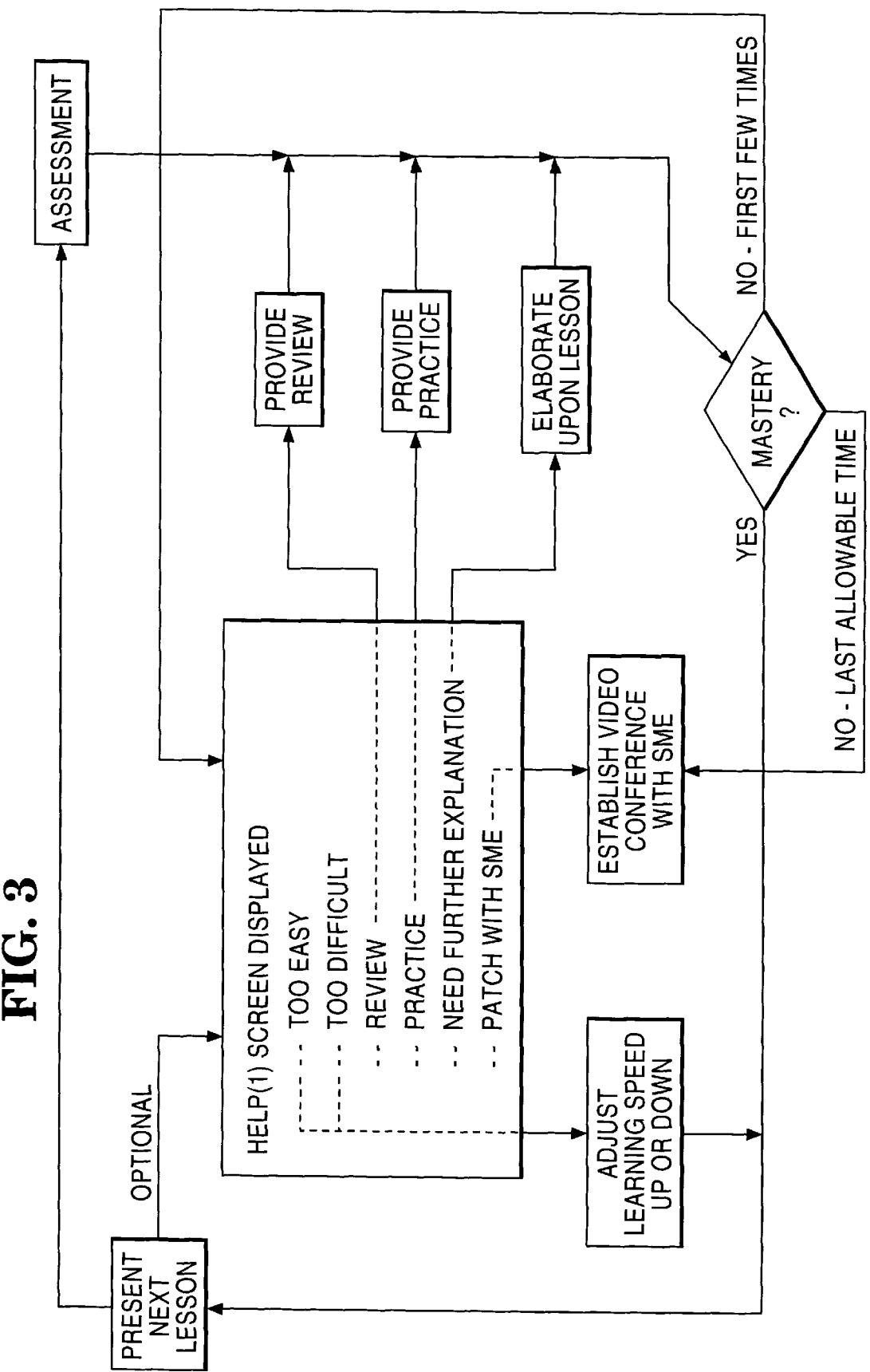
FIGS. 3 and 4 illustrate a more detailed logic flow of the presentation of a lesson.
Figure 4:
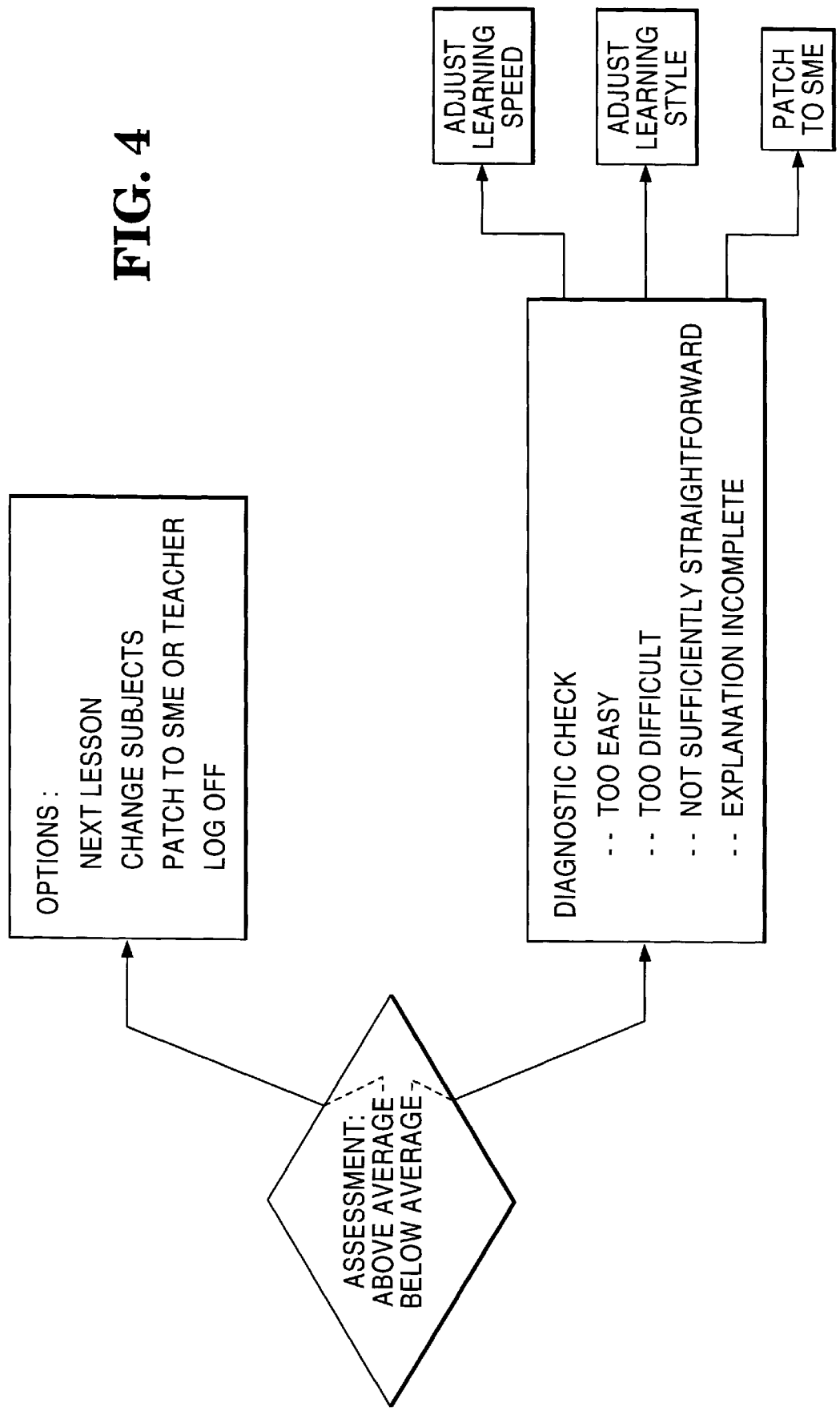

FIGS. 2–4 illustrate part of the procedures described above, in flow-chart fashion, and are considered self-explanatory.

The following references describe ascertainment of a student's learning style, and are incorporated by reference.

REFERENCES

Anderson, Scarvia; Ball, Samuel; Murphy, Richard T., and Associates, *Encyclopedia of Educational Evaluation*, Jossey-Bass Publishers, USA, 1977, pp. 63–65.

Breland, Hunter M., *Assessing Student Characteristics in Admissions to Higher Education: A Review of Procedures*, Research Monograph Number 9, The College Board, New York, 1981, p. 38.

Chopra, Deepak, *Perfect Health*, Harmony Books, 1990.

Entwistle, Noel, *Styles of Learning and Teaching*, John Wiley and Sons, Ltd., 1981, pp. 87–116.

Gagne, Robert M., and Briggs, Leslie J., *Principles of Instructional Design*, Second edition, Holt, Rinehart and Winston, USA, 1979.

Gagne, Robert M., *Essentials of Learning for Instruction*, The Dryden Pres, University of Florida, 1975.

Gagne, Robert M., *The Conditions of Learning*, Holt, Rinehart and Winston, 1977.

Hilgard, Ernest R. and Bower, Gordon H., *Theories of Learning*, Fourth Edition, Prentice Hall, 1975.

Scott J. William A.; Osgood, D. Wayne; and Peterson, Christopher, *Cognitive Structure, Theory and Measurement of Individual Differences*, V. H. Winston and Sons, Washington, D.C., 1979, pp. 36–83.

Smith, H. C., "Psychometric Checks on Hypothesis Derived from Sheldon's Work on Physique and Temperament," *Journal of Personality*, 17:310–320, 1949.

*Standards for Educational and Psychological Tests*, American Psychological Association, Inc., Washington, D.C., 1974.

Thorndike, Robert L., and Hagen, Elizabeth P., *Measurement and Evaluation in Psychology and Education*, Fourth Edition. John Wiley and Sons, Inc., 1977, pp. 394–445.

Definitional Matters

One definition of the following terms is given.

Curriculum is the overall course of study taken by a student. For example, a college curriculum for a major in mathematics has a known content.

A subject is a subset of a curriculum. For example, for a curriculum in mathematics, differential equations is a subject. A Topic is a subset of a subject. For example, for differential equations, a topic is the Wronskian.

A lesson explains one or more topics.

A teaching strategy is designed to accommodate a student's preferred learning style, such as the holistic style.

Communicators are devices which allow remote interaction with a computer. A PC containing a modem is one example. However, communicators are not limited to PCs. A home television, and telephone, can be used as communicators, when equipped with appropriate, known, auxiliary equipment.

Patching is a term taken from the ham radio art, and refers to establishing a telecommunication link.

Concatenable means able to be expanded by concatenation.

Progressive means adaptable to arrangement in a progression, or sequence. For example, the subjects taught in grades 1 through 5 are arranges in a sequence, and are progressive.

Roving Communicators refer to the absence of tethers which force the Communicators to be used at a fixed location. A PC using a cellular modem provides an example of a Roving Communicator.

Numerous substitutions and modifications can be undertaken without departing from the true spirit and scope of the invention.

What is desired to be secured by Letters Patent is the invention as defined in the following claims:

1. A computer system which presents educational material to a student and tests the student's grasp of the material, comprising:
   (a) profile generation means, performed by the computer system, for obtaining information from the student, for using the information to generate a profile of the student, which includes an indication of a preferred learning style of the student, and for storing the profile on the computer system; and
   (b) intelligent administrator means, performed by the computer system, for examining the student's profile stored in the computer system, for selecting lessons for the student based on the student's profile, for administering examinations to the student corresponding to the selected lessons, and for establishing a video conference between the student and a subject matter expert when the student fails to demonstrate mastery of the selected lessons.

2. A system according to claim 1, in which the profile generation means comprises means for obtaining information from the student both actively and non-intrusively.

3. A method of teaching using a computerized system which presents material to students, and assesses whether students understand the material presented, comprising the following steps:
   (a) creating profiles in the computer system, which describe learning characteristics of students, based on factors which include one or more of the following: (i) standardized test results; (ii) results of personal interviews; and (iii) evaluation of student's performance of assigned tasks;
   (b) storing the profiles within the computer system;
   (c) examining the student's profile stored in the computer system;
   (d) selecting lessons for the student based on the student's profile;
   (e) administering examinations to the student corresponding to the selected lessons; and
   (f) establishing a video conference between the student and a subject matter expert when the student fails to demonstrate mastery of the selected lessons.

4. A method of teaching using a computer system which contains a plurality of lessons, comprising the following steps:
   (a) storing learning profiles which contain information about learning characteristics of students in the computer system;
   (b) selecting lessons for students, based on the profile;
   (c) administering examinations to the student corresponding to the selected lessons; and
   (d) establishing a video conference between the student and a subject matter expert when the student fails to demonstrate mastery of the selected lessons.

* * * * *